Sept. 19, 1967 D. J. BARTELINK 3,343,097

SOLID STATE PLASMA ACOUSTIC AMPLIFIER WITH HEAT DISSIPATING MEANS

Filed Oct. 17, 1966

INVENTOR
D. J. BARTELINK
BY David P. Kelley
ATTORNEY

United States Patent Office 3,343,097

Patented Sept. 19, 1967

3,343,097

SOLID STATE PLASMA ACOUSTIC AMPLIFIER WITH HEAT DISSIPATING MEANS

Dirk J. Bartelink, Morris Township, Morris County, N.J., assignor to Bell Telephone Laboratories, Incorporated, Berkeley Heights, N.J., a corporation of New York Filed Oct. 17, 1966, Ser. No. 587,211

5 Claims. (Cl. 330—5)

ABSTRACT OF THE DISCLOSURE

An acoustic amplifier comprises a block of material such as bismuth having a narrow interaction region between two massive integral heat dissipating regions. Electric and magnetic fields produce a charge carrier flow in the direction of acoustic wave in the interaction region with a minimum of net current in that region.

Figure 1:
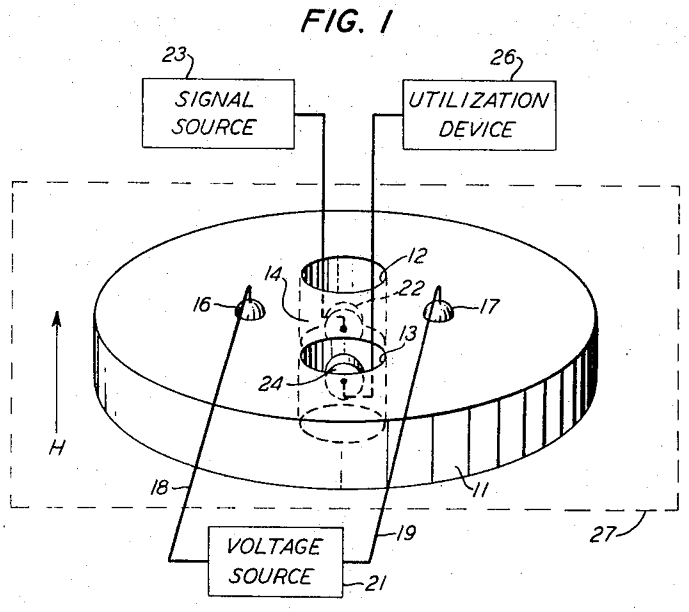

This invention relates to solid state amplifiers and, more particularly, to solid state acoustic wave amplifiers.

Certain materials, such as bismuth, for example, have been made to amplify acoustic waves in the high frequency range. In general, these amplifiers rely upon a carrier drift within the material to generate phonons which amplify an acoustic wave traveling through the material in the same direction as a component of the drift current. Such an amplifier gives promise of great utility, primarily because of its simplicity, but, as it presently exists in the prior art, it possesses certain inherent disadvantages. Some devices are of a material that is highly magnetoresistive, and they also require a magnetic field. As a consequence current flows easily in the direction of the magnetic field, but encounters high resistance in directions transverse to the magnetic field. In the operation of these devices, optimum amplification has been achieved for current flow transverse to the magnetic field. As a result, and because of the high resistance, there is a large amount of heat generated. Since these are low temperature devices, this heat makes it extremely difficult to maintain the proper operating temperature.

For maximum utilization of the current flow, or carrier drift, it is necessary to constrain the current flow to a small volume through which the acoustic waves propagate. In order to constrain the current, small crystals have been utilized heretofore, which compounds the problem of excessive heat. As a consequence, prior art devices comprise a small crystal with heat sinks mounted thereon. The nature of the crystalline material is such that the small crystals are quite delicate, and the presence of the heat sinks creates a differential expansion which places harmfully large strains on the crystal. In addition, the heat sinks are inefficient because of the poor heat conduction across the insulating interface between them and the crystal. In addition, the crystals are generally so small and delicate that a great deal of care must be exercised in handling and mounting them.

The present invention effectively overcomes these various problems and difficulties without in any way derogating from the achievement of optimum efficiency of operation of the device as an amplifier.

In an illustrative embodiment of the invention, a disc of suitable material such as, for example, bismuth, has a pair of closely spaced holes drilled therethrough substantially normal to the plane of the disc so that an isthmus is formed in the disc between the two holes, the ends of the isthmus being integral with a pair of heat dissipation areas in the disc. A voltage is applied along the isthmus from one end to the other by a suitable voltage source connected to the disc by suitable leads which preferably are attached to the disc at the ends of the isthmus. Electro-acoustic transducers for launching in and removing from the disc an acoustic wave are mounted on the disc in a manner such that the acoustic wave propagates through the isthmus in a direction normal to the direction of the holes, i.e., substantially in the plane of the disc and normal to the direction of the applied voltage. A magnetic field is applied to the disc by any suitable means in a direction substantially normal to the plane of the disc.

In operation, the application of a voltage produces a carrier drift within the isthmus which, because of the presence of the magnetic field, is parallel to the direction of propagation of the acoustic wave. The acoustic wave is amplified by the drifting carriers whose velocity is made synchronous with the acoustic wave velocity. Because of the unique configuration of the disc and the directions of the applied fields, the carriers, i.e., holes and electrons, both travel in the same direction. For a given drift velocity there is relatively little net current flow, and, as a consequence, a minimum of generated heat. Any heat that is generated is easily dissipated in the disc, which functions as a massive heat sink integral with the isthmus. There is some heat generated by scattering and collision of the carriers. This heat is dissipated by the disc itself acting as a heat sink.

In another illustrative embodiment of the invention, a cylinder of suitable material is slotted so that a thin bridge or web is formed at one end of the cylinder connecting what are, in effect, a pair of relatively massive ears formed by the slot. A voltage is applied to the member from a source by leads connected to the walls of the slot. Electro-acoustic transducers are mounted to the member in such a manner as to launch an acoustic wave in the material for propagation in a direction normal to the axis of the cylinder and through the bridging member. A magnetic field is applied to the member in a direction parallel to the axis of the cylinder.

In operation, application of a voltage to the member produces a carrier drift through the bridging member in the direction of propagation of the acoustic wave. As in the case of the first embodiment, there is little net current flow under conditions necessary for gain and hence a minimum of heat generated in the confined volume of the bridge. The heat that is generated by scattering and collisions is readily dissipated in the massive ears, which function as integral heat sinks.

It is a feature of the invention that a block of acoustic amplifier material is machined to produce a restricted volume through which the charge carriers are constrained to flow and at the same time to produce adequate heat dissipation through heat sinks integral with the restricted volume.

Figure 2:
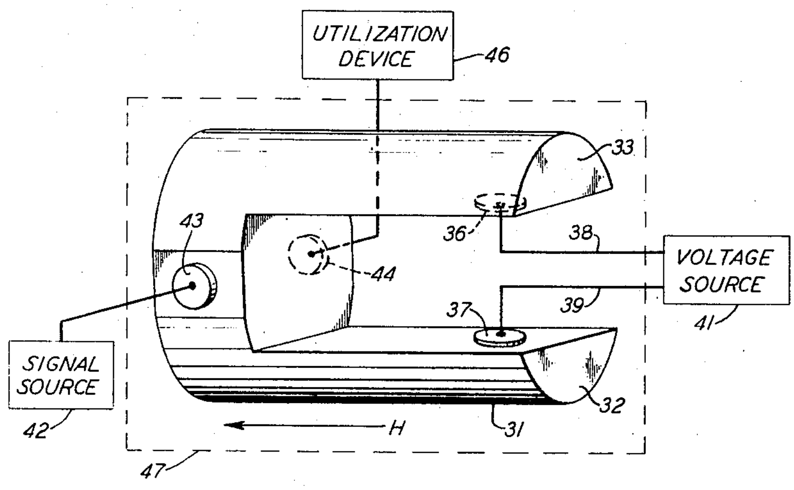

The various features of the present invention will be more readily apparent from the following detailed description, taken in conjunction with the accompanying drawings, in which:

FIG. 1 is a perspective view of a first illustrative embodiment of the invention; and FIG. 2 is a perspective view of a second illustrative embodiment of the invention.

In FIG. 1 there is shown an illustrative embodiment of the invention which comprises a disc or wafer 11 of bismuth, for example, having a pair of holes 12, 13 drilled therethrough in a direction substantially normal to the plane of the disc. Holes 12 and 13 form an isthmus 14 in the disc 11 between a pair of relatively massive areas, and a pair of electrical contacts 16, 17 are mounted at either end of the isthmus 14. Contacts 16, 17 are connected through leads 18, 19 to a suitable voltage source 21.

Mounted within hole 12 is an electro-acoustic transducer 22 to which is connected a source 23 of signals to be amplified. Mounted within hole 13 is an electro-acoustic transducer 24 to which is connected a suitable load or utilization device 26. Transducers 22 and 24 are so mounted that an acoustic wave launched by transducer 22 and collected by transducer 24 travels through disc 11 substantially at right angles to the electric field established in the material by contacts 16 and 17. In the embodiment of FIG. 1, both the electric field and the propagation path of the acoustic wave are parallel to the plane of the sample.

A magnetic field H is applied to the sample by any of a number of suitable means, not shown, in a direction substantially perpendicular to the plane of the disc. While in the present embodiment the field H is substantially perpendicular, it may be at some other angle to the electric field and the wave propagation direction. In some instances the angle may be materially different from ninety degrees for optimum performance, depending upon a number of factors such as the material used, the magnitudes of the fields involved, and the like. The purpose of the magnetic field is to impart a component of drift to the carriers that is directed across the isthmus instead of along it between the two contacts 16 and 17. This component results from the cycloidal motion imparted to the carriers by the magnetic field being at an angle to the electric field. The angle of the magnetic field must, therefore, be such that this drift component, which is in substantially the same direction as the propagation direction of the acoustic wave, exists.

For optimum results, the disc 11 is maintained at a low temperature, depending on the material, such as, for example, four degrees Kelvin. This can be accomplished by any one of a number of suitable means well known in the art. As a consequence, the means for maintaining member 11 at a low temperature has been indicated schematically in FIG. 1 as the dashed box 27.

In operation, when a voltage from source 21 is applied to disc 11 through contacts 16 and 17, an electric field is established which extends along isthmus 14 between the contacts. This field establishes a carrier, i.e., electron and hole, drift within the isthmus. However, because of the presence of the magnetic field H this drift is not along the isthmus, but across it in the direction of propagation of the acoustic waves launched in the material by transducer 22. In the arrangement of FIG. 1, both electrons and holes move in the same direction, and, as a result, there is little net electrical current across the isthmus and hence little heat loss from the carrier movement. The velocity of the carriers is dependent on the electric and magnetic fields, and, at a particular value of field known in the art as the "kink" field, the velocity of the carriers is substantially the same as the velocity of the acoustic waves. As a consequence, a strong electron-phonon interaction occurs with the result that the acoustic wave is amplified. The amplified wave is converted to an electrical signal by transducer 24 and applied to the load or utilization device 26.

The construction of the embodiment of FIG. 1 is well suited to the rapid dissipation of the heat generated during operation. The relatively massive disc is integral with the narrow isthmus where the amplification takes place. and acts as an efficient heat sink. Since the disc is of the same material as the isthmus, and there are no junctions, little or no strain is placed upon the isthmus. In addition, the disc, being considerably larger than the interaction region, is easy to handle and mount with little or no likelihood of damage to the isthmus.

In FIG. 2 there is shown a second illustrative embodiment of the invention in which a cylindrical member 31 of suitable material such as bismuth or antimony has a slot cut along the length thereof to form a pair of ears 32, 33 and a web or bridge portion 34 joining the ears 32, 33. A voltage is applied to ears 32, 33 through contacts 36 and 37, connected through leads 38, 39 to a suitable voltage source 41.

Waves to be amplified are applied to the web 34 from a source 42 by means of an acoustoelectric transducer 43, and the output of the amplifier is taken through an acoustoelectric transducer 44 and applied to a suitable load device 46. A magnetic field formed by any suitable means, not shown, is directed through the web 34 in a direction substantially parallel to the axis of cylinder 31, and substantially normal to the direction of propagation of the acoustic signal wave through the web or bridge. As was the case with the embodiment of FIG. 1, the magnetic field may be at some other angle than ninety degrees to the acoustic wave direction, the particular angle mentioned here being for purposes of illustration only. The cylinder 31 is maintained at the proper operating temperature by any suitable means known in the art, indicated in FIG. 2 by the dashed box 47.

In operation, a voltage applied to ears 32, 33 generates a current that flows as a sheet on the inner surface of the ears. This current behavior, which is a direct result of the magneto-resistance property of the material, causes little loss from heating. In the web or bridge portion 34, both electrons and holes drift in the direction of acoustic wave propagation due to the presence of the magnetic field. As was the case with the arrangement of FIG. 1, there is little net current since the two types of carriers are of opposite sign and moving in the same direction. Thus there is little heat generated. Heat is generated by carrier scattering and collisions which produce a current flow at right angles to the acoustic wave direction, between the two ears 32 and 33. However, this heat is quickly dissipated by the heat sink action of members 32 and 33, with the result that heating has little or no effect on the operation of the device.

The principles of the invention have been illustrated in two preferred embodiments. These principles can readily be utilized in other configurations without departure from the spirit and scope of the invention.

What is claimed is:

1. An acoustic wave amplifying device comprising a member of magneto-resistive material having a restricted portion defining an interaction region and first and second heat dissipating areas integral therewith and substantially larger than said restricted portion, means for applying an electric field to said restricted portion, said field giving rise to a carrier flow in said restricted portion, means for applying a magnetic field to said restricted portion at an angle to the direction of the applied electric field, the angle of the magnetic field being such as to produce a component of carrier drift transverse to the direction of the electric field in said restricted portion, means for launching an acoustic wave in said restricted portion at an angle to the electric and magnetic fields, and in substantially the same direction as the transverse component of carrier drift, and means for abstracting an amplified wave from said sample.

2. An acoustic wave amplifying device as claimed in claim 1 wherein said member comprises a disc having a pair of spaced holes therein, the space between the holes defining said restricted portion and the portions of the disc adjacent the ends of the restricted portion defining the heat dissipating areas.

3. An acoustic wave amplifying device as claimed in claim 1 wherein said member comprises a cylinder having a slot extending longitudinally through said cylinder from one end thereof to a point adjacent the other end and forming a narrow restricted portion at said other end of the cylinder.

4. An acoustic wave amplifying device as claimed in claim 1 wherein said magneto-resistive material is bismuth.

5. An acoustic wave amplifying device as claimed in claim 1 wherein said magneto-resistive material is antimony.

No references cited.

ROY LAKE, *Primary Examiner.*

DARWIN R. HOSTETTER, *Examiner.*